April 8, 1941.   J. H. SMITH, JR   2,237,848
BOMB CATAPULT
Filed March 15, 1939   4 Sheets-Sheet 1

Inventor
J. H. Smith, Jr.

By Clarence A. O'Brien
and Hyman Berman
Attorneys

April 8, 1941.  J. H. SMITH, JR  2,237,848
BOMB CATAPULT
Filed March 15, 1939  4 Sheets-Sheet 2
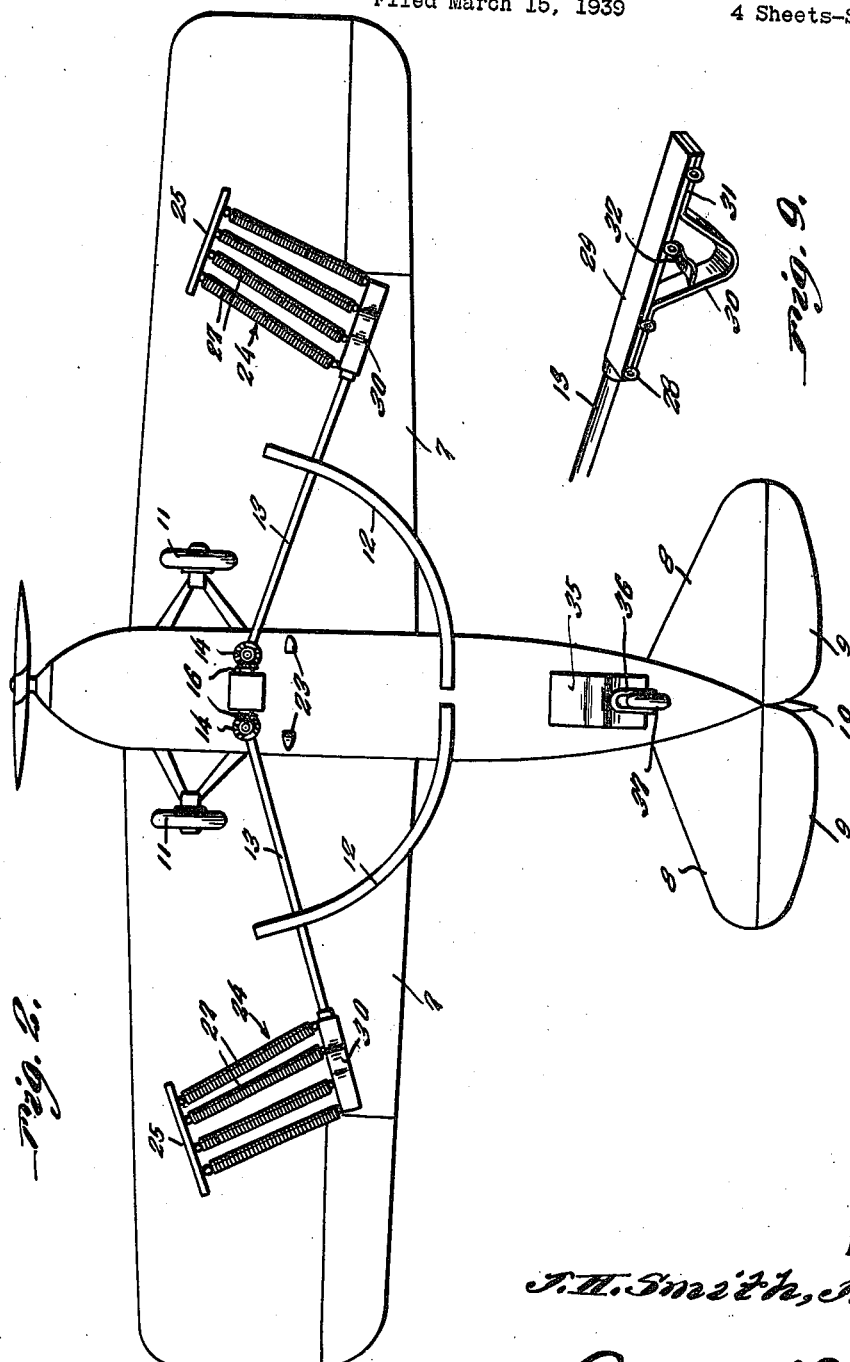
Inventor
J. H. Smith, Jr.
By Clarence A. O'Brien
and Hyman Berman
Attorneys

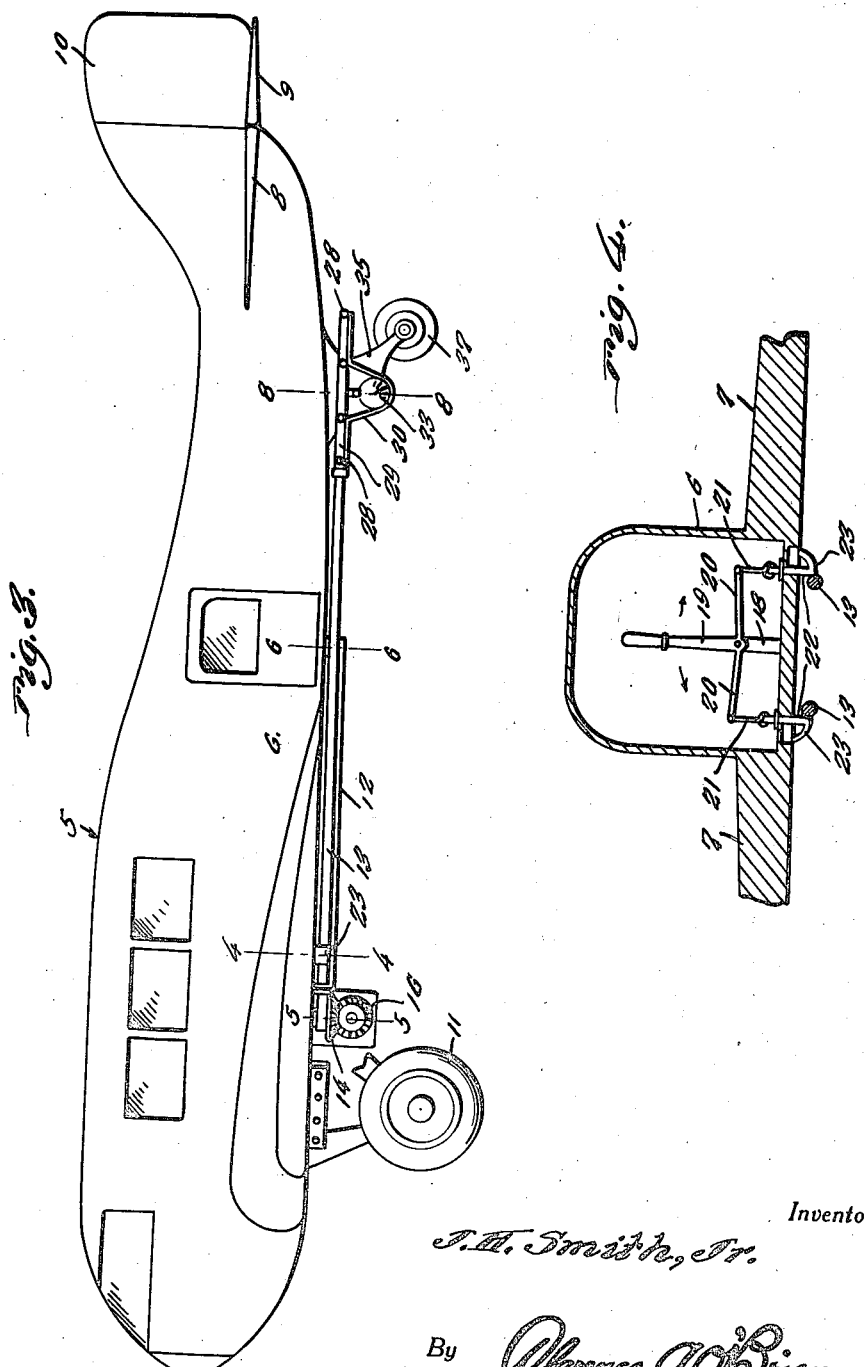

April 8, 1941.  J. H. SMITH, JR  2,237,848
BOMB CATAPULT
Filed March 15, 1939    4 Sheets-Sheet 4
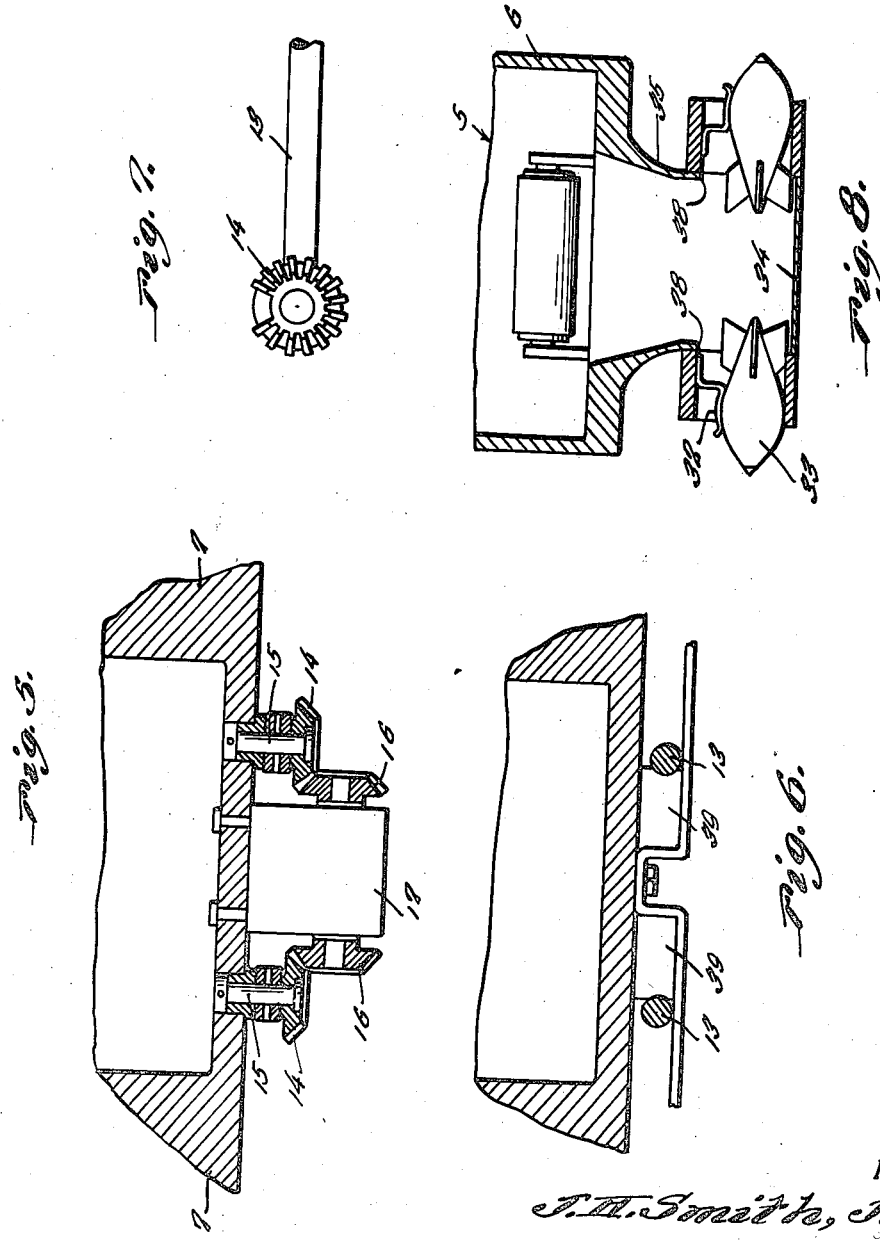
Inventor
J. H. Smith, Jr.
By Clarence A. O'Brien
and Hyman Berman
Attorneys

UNITED STATES PATENT OFFICE 2,237,848

BOMB CATAPULT

John Henry Smith, Jr., Columbus, Ohio

Application March 15, 1939, Serial No. 262,045

2 Claims. (Cl. 89—1.5)

This invention appertains to new and useful improvements in bombing mechanism for aircraft.

The principal object of the present invention is to provide bombing mechanism for aircraft in the nature of a catapult for projecting the bombs in a direction toward the objective while the aircraft is traveling at high speed, thus permitting the aircraft to swing off laterally in advance of its objective, thus eliminating the danger from anti-aircraft guns, as when the aircraft is compelled to pass directly over the objective to accurately send off its load of bombs.

Another important object of the invention is to provide a bomb catapulting means for aircraft which can be set for operation while the aircraft is traveling toward its objective, and preferably not until after it has passed over into enemy territory.

These and other objects and advantages of the invention will become apparent to the reader of the following specification.

In the drawings—

Figure 2 represents a bottom plan view of the aircraft with the catapulting means in unset position.

Figure 3 is a side elevational view of the aircraft with a portion broken away disclosing the drive means.

Figure 4 is a fragmentary detailed sectional view on a line 4—4 of Figure 3.

Figure 5 is a sectional view on a line 5—5 of Figure 3.

Figure 6 is a sectional view taken substantially on a line 6—6 of Figure 3.

Figure 7 is a fragmentary side elevational view of one of the catapult arms.

Figure 8 is a sectional view on the line 8—8 of Figure 3.

Figure 9 represents a fragmentary perspective view of the bomb carrying end of one of the catapult arms.

Figure 1:
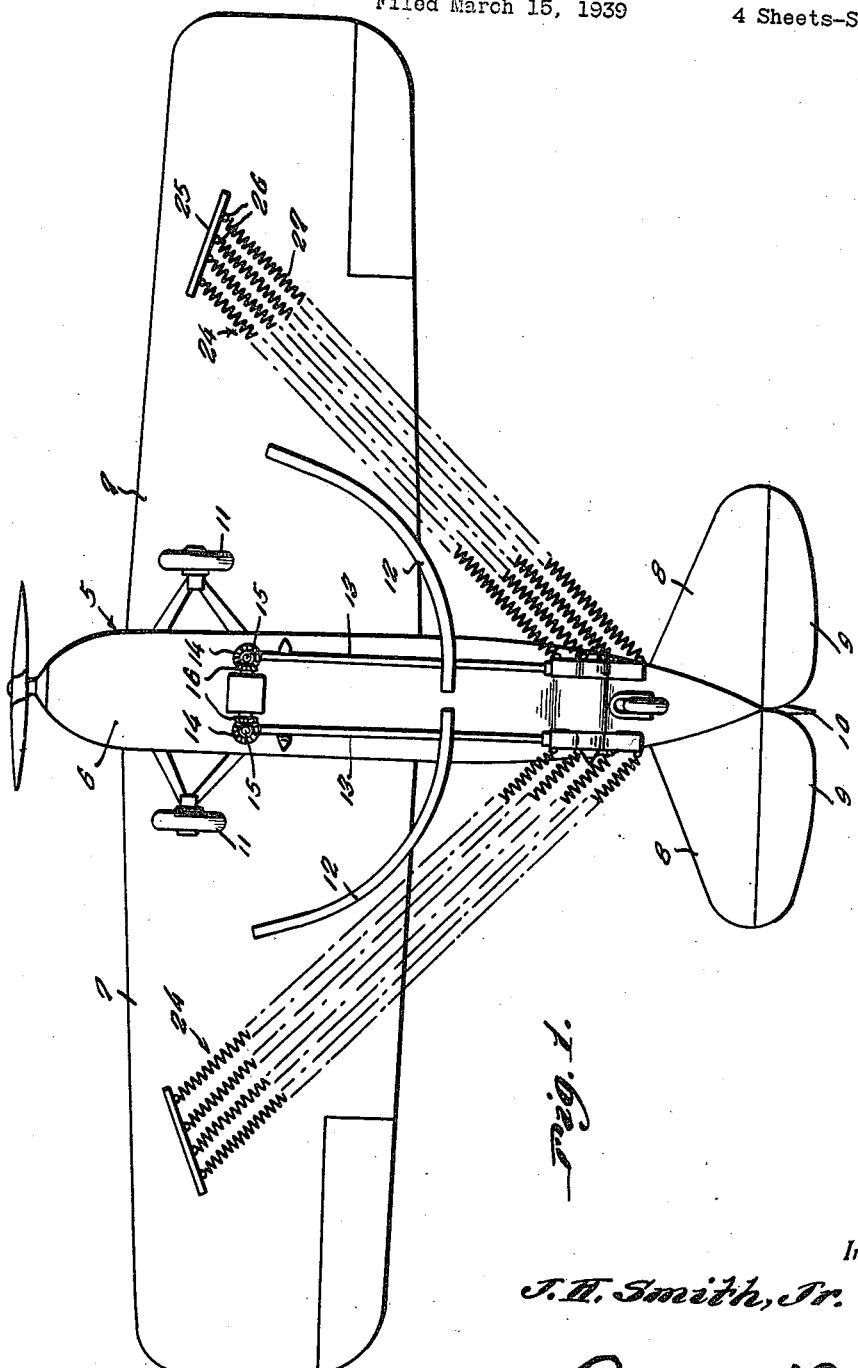
Figure 1 represents a bottom plan view of the aircraft equipped with the novel catapulting means.

Referring to the drawings, wherein like numerals designate like parts, it can be seen that the numeral 5 generally refers to a conventional aircraft which includes the fuselage 6 and the laterally disposed wings 7—7. The usual stabilizers, elevators and rudder are denoted by numerals 8, 9 and 10.

The landing wheels are denoted by numeral 11.

In carrying out the present invention an arcuate track 12 extends from each wing 7 to a midpoint of the fuselage 6 at the under side thereof. The ends of these tracks 12 are bent upwardly, one end of each track being secured to its corresponding wing 7 while its rear end is secured to the fuselage 6.

Upon these tracks 12 ride the catapult arms 13—13, each of which at its fuselage end being equipped with a bevel gear 14 rotatably mounted on the stub shaft 15 depending from the fuselage 6. These gears 14 mesh with gears 16 at the ends of the shaft of the motor 17 which can be suitably mounted under the cabin portion of the fuselage 6.

In the cabin portion of the fuselage 6 is the upstanding post 18 on which is the swingable hand lever 19 from the lower end of which projects laterally the arms 20—20, these arms at their outer ends being connected by links 21 to the bolts 22, each of which is provided with a backwardly and obliquely disposed extension 23.

Obviously, by rocking the hand lever 19 in one direction, one bolt 22 can be released and subsequently by rocking the hand lever 19 in the opposite direction the other bolt 22 can be released, and when these bolts are released, the arms 13 are free to be swung violently at high velocity by the two banks of springs generally referred to by numerals 24—24.

On each wing 7 is a narrow depending cleat 25 having a plurality of eyes 26 on its rear side. Extending from the eyes of each of the cleats are the elongated tension springs 27 which connect at their rear ends to the eyes 28 on the platelike extension 29 of the free end of the corresponding arm 13. Obviously, when the arms 13 are in the position shown in Figure 1, the springs 27 are under tension and upon releasement of the before described bolts 22 the arms will be released and the springs will pull the arms 33 forwardly with great velocity so that the force of this action will discharge the bombs from the stirrups 30. These stirrups 30 are suitably secured to the underside of the arm plate 29.

These stirrups 30 are each of substantially V-shape having laterally disposed extensions 31 suitably secured to the under side of the plate 29, and an arcuate shaped spring 32 engages the side of the bomb 33 in the manner substantially shown in Figure 8 to hold the bomb in the stirrup so that it can only be released by centrifugal force or when the arms 13 strike the upwardly turned ends of the tracks 12.

It can be seen that these springs 32 engage the bombs 33 and that the tail portions of these bombs overlap the floor 34 of the shell formation 35 from which the mounting 36 for the rear wheel 37 depends. In other words, the plate ends 29 of the arms 13 abut the shell 35 at opposite sides thereof with the opening of the stirrups 30 registering with the openings 38 in the opposite sides of the shell 35.

Suitable bumpers of resilient material and denoted by numeral 39 can be provided at the ends of the tracks 12 to absorb the shock of the arms striking against the same.

While the foregoing specification sets forth the invention in specfic terms, it is to be understood that numerous changes in the shape, size and materials may be resorted to without departing from the spirit and scope of the invention as claimed hereinafter.

Having described the invention, what is claimed as new is—

1. In combination with an aircraft having a fuselage and wings, a hollow depending structure at the tail portion of the fuselage, a swingable arm, said arm being swingably connected to the underside of the fuselage adjacent the forward portion thereof, guide means between one of the wings and the intermediate portion of the fuselage for guiding the arm on a plane substantially parallel to the plane of the said wing, tension spring means interconnected between the free end portion of the arm and the wing, trigger means between the fuselage and the arm for holding the free end portion of the arm against the said hollow depending structure, said arm being provided at its free end with a bomb receiving stirrup registrable with the hollow structure, detent means in the stirrup for holding a bomb therein and partly protruding into the hollow depending structure.

2. In combination with an aircraft having a fuselage and wings, a hollow depending structure at the tail portion of the fuselage, a swingable arm, said arm being swingably connected to the underside of the fuselage adjacent the forward portion thereof, guide means between one of the wings and the intermediate portion of the fuselage for guiding the arm on a plane substantially parallel to the plane of the said wing, tension spring means interconnected between the free end portion of the arm and the wing, trigger means between the fuselage and the arm for holding the free end portion of the arm against the said hollow depending structure, said arm being provided at its free end with a bomb receiving stirrup registrable with the hollow structure, detent means in the stirrup for holding a bomb therein and partly protruding into the hollow depending structure, and a power plant cooperative with the swingable end of the arm to drive the arm to a position maintaining the spring means under tension and the stirrup in registration with the depending hollow structure.

JOHN HENRY SMITH, Jr.